J. S. BURNHAM.
Cornstalk Cutter.
No. 11,688.
Patented Sept. 19, 1854.
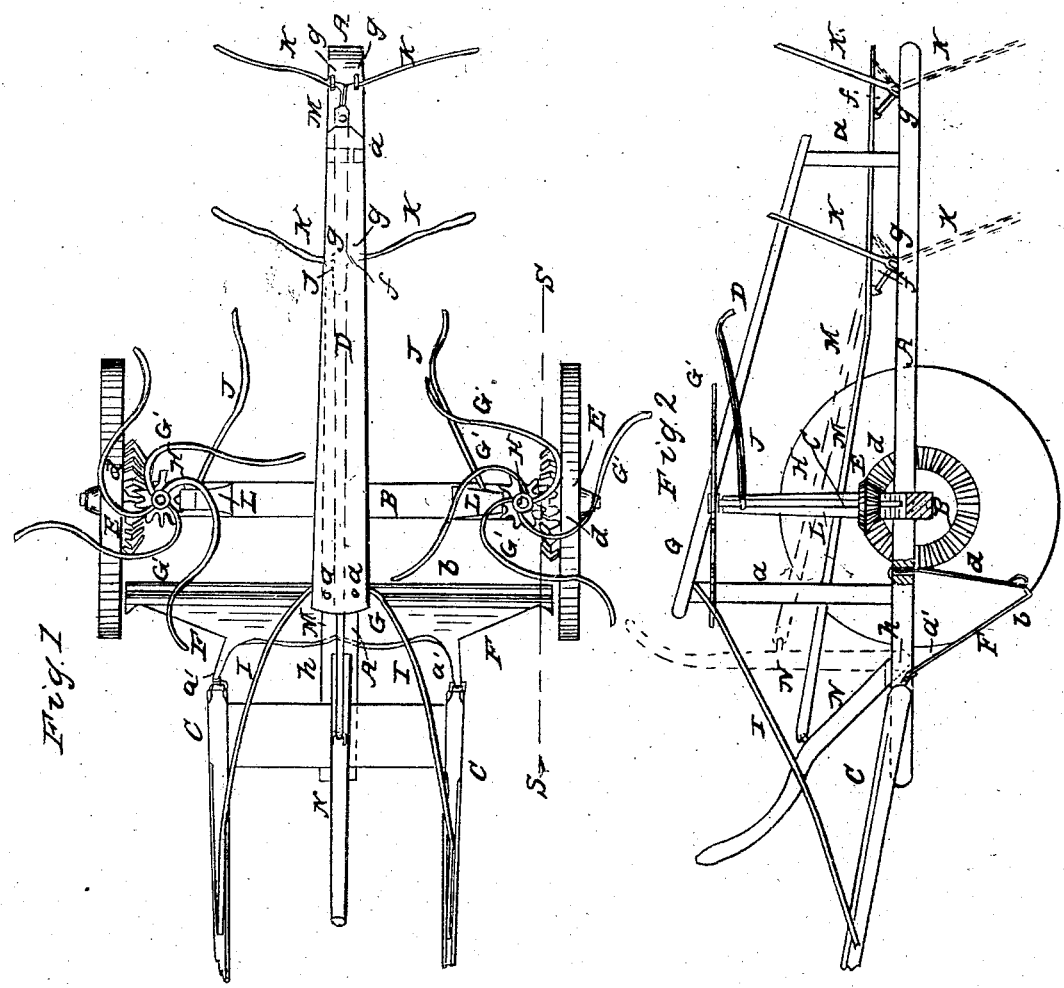
Witnesses
N. C. Davis
L. A. Burnham
Inventor
James S. Burnham

UNITED STATES PATENT OFFICE.

JAMES S. BURNHAM, OF WEST JEFFERSON, OHIO.

IMPROVEMENT IN MAIZE-HARVESTERS.

Specification forming part of Letters Patent No. 11,688, dated September 19, 1854.

*To all whom it may concern:*

Be it known that I, J. S. BURNHAM, of West Jefferson, in the county of Madison and State of Ohio, have invented a new and useful Improvement in Machines for Harvesting Cornstalks; and I do hereby declare that the following is a full, clear, and exact description of the same, reference being had to the accompanying drawings, forming part of this specification, in which—

Figure 1 is a plan or top view of a cornstalk, harvester with my improvements. Fig. 2 is a vertical longitudinal section through the red dotted line *s s* in Fig. 1.

Similar letters of reference indicate corresponding parts in both figures.

The first part of this invention relates to the employment of an oblique self-adjusting platform, having cutting-edges arranged or formed on its front edge, one near either end, and a flange at its back edge. By this arrangement the cutters are caused to cut in an oblique upward direction, and consequently bring the stalks down with greater ease and certainty than if the cutting were performed in an oblique downward direction. The stalks can also be sustained by the flange on the platform and prevented from falling to the ground before they are caught by the reels and thrown into the receiver.

The second part of this invention relates to the employment of horizontal collecting-reels, having their arms made elastic and of cyma-reversa shape, in combination with a novel arrangement of guards, oblique fenders, curved directing-arms, and receivers or bundlers. By this arrangement the stalks can be brought to the proper position for being cut, and after being cut prevented from falling crosswise the machine, and collected and held until a sufficient quantity to form a bundle has been cut.

The third part of this invention relates to a simple manner of arranging the receiving-arms and attaching them to a shifting-lever, whereby the driver can discharge the stalks, when necessary, with ease and dispatch without changing his position or leaving his seat.

To enable others skilled in the art to make and use my invention, I will proceed to describe its construction and operation.

The frame of the machine consists of a beam, A, to which are attached the axle B, shafts C C, and the standards *a a* of the partition D.

The machine is supported on wheels E E and drawn by a horse attached within the thills, and cuts down two hills of corn at one operation.

F F are two cutting-edges, formed or secured on the front and near either end of a swinging platform, G. This platform has a flange, *b*, at its back for the stalks to rest against until thrown into the receiver, and is hinged by the arms *a' a'* to the shafts C C, at or near their back extremities, and suspended in an oblique position by the short connecting rod or chain *d*, which permits it to play upward when it meets with resistance.

By hanging the platform in an inclined position the cutting-edges or cutters, which may be at right angles to the line of motion or form an oblique angle therewith, are caused to sever the stalks by an oblique upward stroke, such stroke being found by experience in cutting with the knife in hand to bring down the corn with the greatest ease and certainty.

The arms *a' a'* may be made elastic, so as to allow the cutters to adjust themselves, in a measure, independent of each other. The arrangement of the platform and cutters will be clearly seen by examining the drawings, Figs. 1 and 2.

G' G' are curved elastic collecting-arms, attached to the upper extremities of vertical revolving shafts H H, having bevel-pinions *c c* on them, which gear into bevel-wheels *d d* on the inner surface of the propelling-wheels. The collecting-arms are made of cyma-reversa shape, or curved, as shown in the drawings, for the purpose of keeping the stalks near their outer extremities, and are made elastic, in order that they may yield or spring back when necessary. These arms serve for bringing the stalks in proper position for being cut down, and also throwing them into the receiver.

I I are guards extending from the shafts to the driver's seat or partition to prevent stalks escaping from the collecting-arms and falling across the machine.

J J are guides by which the tops of the stalks, after being carried back by the reels, are liberated therefrom and compelled by the peculiar shape of said guides to fall within the receivers K K. These guides are attached to the posts L L, which are framed into the axle so as to rise obliquely outward toward the wheels. The posts, by their obliquity, act as fenders, causing the butt-ends of the falling stalks to assume a position between the rows of corn and out of the way of the cutting-edges. These posts also serve for receiving the upper bearings of the vertical shafts, the lower bearings of said shafts being in the axle B.

The arms or receivers K K are arranged in pairs, one on either side of the partition D, and are attached to crank-axles $f f$, which turn in bearings $g g$ on the beam A. To the axles $f f$ the connecting-rod M is jointed by eye-links, as represented. The rod M passes through the standards of the partition D, and is jointed to the shifting hand or foot lever N, which has its fulcrum $h$ in the beam.

The operation is as follows: As the machine advances the stalks of corn are gathered in by the collecting-arms and severed near the ground by the cutting-blades, and while supported by the platform and flange are thrown back by the collecting-arms, aided by the guides, into the receivers, where they accumulate. As soon as the receivers are filled the lever and connecting-rod are moved to the position shown in red in Fig. 2, and the position of the receiving-arms thereby changed from an upward to a downward inclination, as shown in red, and the stalks consequently caused to slide off upon the ground. The stalks being discharged, the lever is moved back to its place, and the receivers thereby adjusted to the position shown in black.

This machine is rendered exceedingly simple by the arrangement of the cutters, and also very compact, and consequently is not very liable to get out of order, which is a great desideratum in machines of this nature.

What I claim as my invention, and desire to secure by Letters Patent, is—

1. The employment and arrangement of the oblique self-adjusting cutting and sustaining platform, having a flange on its back edge and cutters arranged or formed on its front edge near either end, substantially as and for the purpose herein described.

2. The employment of the horizontal collecting-reels, having their arms G G made elastic and of cyma-reversa shape, in combination with the guards I I, oblique fenders L L, guides J J, and receivers or bundlers K K, substantially as and for the purpose described.

3. The arrangement of the receiver-arms or bundlers, moved by the shifting-lever and connecting-rod, for the purpose of readily effecting the discharge of the stalks, substantially as herein described.

JAMES S. BURNHAM.

Witnesses:
N. C. DAVIS,
L. A. BURNHAM.